Nov. 24, 1953 — A. A. G. MAGIS — 2,660,070
CHANGE-SPEED GEARBOX
Filed Dec. 26, 1947 — 2 Sheets-Sheet 1
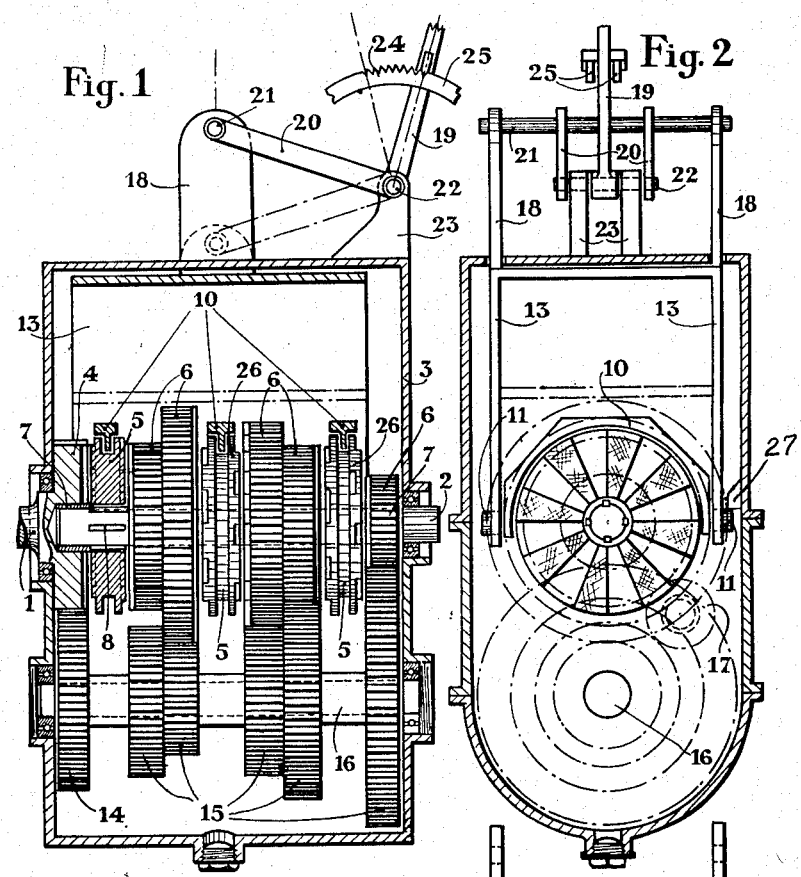
INVENTOR.
Auguste Adelin Gustave Magis
BY
Blair, Curtis + Hayward Nov. 24, 1953  A. A. G. MAGIS  2,660,070
CHANGE-SPEED GEARBOX
Filed Dec. 26, 1947  2 Sheets-Sheet 2
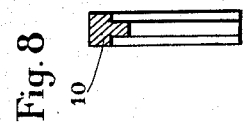
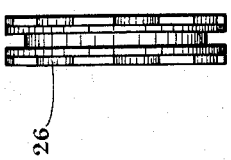
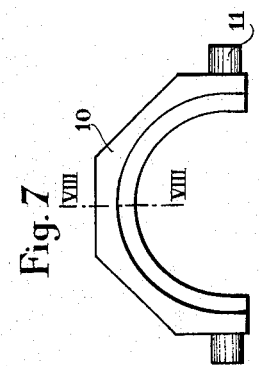
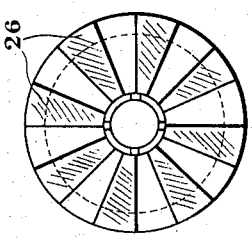
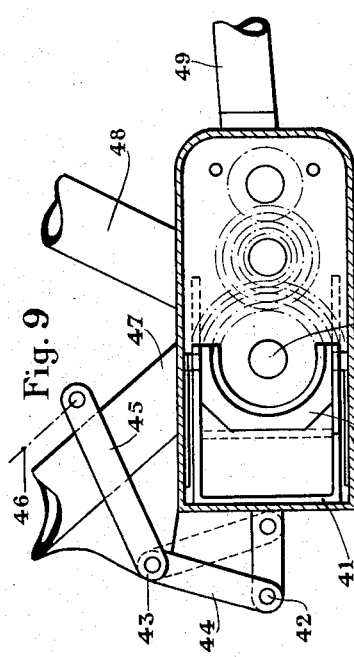
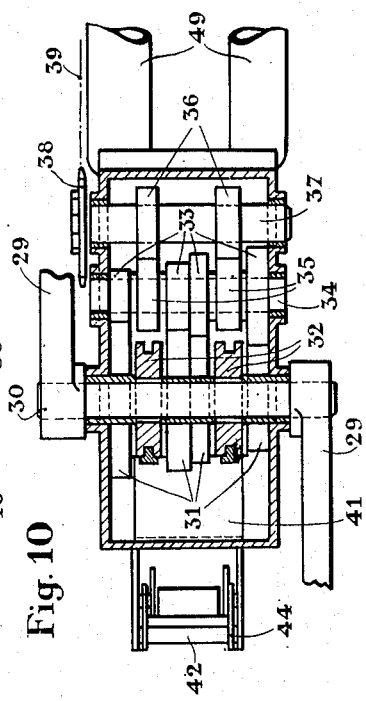
INVENTOR.
Auguste Adelin Gustave Magis
BY
Blair, Curtis + Hayward Patented Nov. 24, 1953

2,660,070

UNITED STATES PATENT OFFICE 2,660,070

CHANGE-SPEED GEARBOX

Auguste Adelin Gustave Magis, Paris, France

Application December 26, 1947, Serial No. 793,952
In France April 8, 1943

Section 1, Public Law 690, August 8, 1946
Patent expires April 8, 1963

1 Claim. (Cl. 74—337.5)

The present invention relates to change-speed gearboxes of the type in which the gear wheels are constantly meshed.

An improved change-speed gearbox according to the invention, having constantly meshing gears some of which are connected to a shaft and the others, rotatably mounted on a second shaft parallel with the first one, are coupled to this second shaft by displacements of dog clutches slidably mounted upon it, includes ramps or cam surfaces adapted to control the displacements of each dog-clutch, the various ramps being suitably staggered and connected to a common operating member in such a way that to each operative position of such member corresponds a predetermined combination of positions of the dog-clutches and consequently a similarly predetermined ratio of speed transmission.

Preferably the operating member is constituted by a pair of plates each containing as many cam grooves or slots as there are dog-clutches to be controlled and each groove is engaged by a finger adapted to act on the corresponding dog-clutch, the edges of the grooves having at suitable points notches which compel the corresponding clutches to slide in one direction or the other.

In order to couple them together each free gear and the corresponding dog-clutch may be provided with lateral teeth on their adjacent faces and one and the same clutch is preferably toothed on both its faces so as to serve for two speeds.

The working of a change-speed gearbox constructed in accordance with the present invention is simple and reliable, and a single lever provided with a locking device may serve to control the movements of the grooved plates or grids. Since all the wheels rotate continuously, engagement takes place only between wheels the speeds of which are very similar, there being thus practically no shock or noise during engagement. The shafts are consequently very short as also the dog-clutches which need only be of such width as is imposed by the rate of wear of the metal employed.

Clutching by means of lateral teeth permits the amount of space occupied to be reduced to a minimum, since the width of the teeth may be very great and their depth very small. The gear is silent and simple in operation, and is thus suitable for motor vehicles as well as for machine tools for precision work and large output, rolling mills and the like.

This change-speed gearbox is suitable for all powers and for all speeds. When used on a bicycle it may weigh less than a kilogram but it may attain a weight of several tons when used on a very large rolling mill train. In comparison with the gearboxes usual on modern cars, its length may be reduced by 40%.

The present gearbox may be provided with wheels having spur, helical or skew teeth, and the shafts may be provided with any of the known types of bearings.

Two embodiments of the invention will be described by way of example with reference to the accompanying drawings in which:

Figure 1 is a view partly in section in the plane of the shafts of a change-speed gearbox for a motor car having four speeds and reverse drive;

Figure 2 is a section at right angles to the shafts of the same gearbox;

Figure 3 shows in elevation the grid which serves to move the sliding pinions;

Figure 4 is an end view thereof;

Figure 5 is a side view of one of the dog-clutches;

Figure 6 is a front view thereof;

Figure 7 is a side view of a fork for operating one of the dog-clutches;

Figure 8 is a vertical section on the line VIII—VIII of Figure 7;

Figure 9 is a part sectional side view of a four speed gearbox suitable for a bicycle; and Figure 10 is a section in the plane of the shafts of the same gearbox.

Referring now to the drawings and more particularly to Figures 1 to 8, the driving shaft 1 is in line with the main shaft 2, both being mounted in the casing 3 by the usual means. One end of the main shaft 2 rotates in a socket provided for it in the driving shaft 1. This latter carries a toothed wheel 4. On the main shaft 2 are strung successively dog-clutches 5 and pinions 6. The clutches 5 are driven by the main shaft 2 by means of keys 8 on which they are adapted to slide, while the pinions rotate loosely on the main shaft 2 from which they are separated by rings 7. Finally the dog-clutches are provided with forks 10 the trunnions 11 of which (see Figure 2) ride in cam grooves 12 formed in the two flanks of a grid 13. The pinions 4 and 6 gear with their corresponding wheels 14 and 15 mounted on a lay shaft 16. The gear wheels are always in engagement.

The reverse drive is effected through the medium of an idler pinion 17 which meshes with two others carried by the main shaft 2 and the lay shaft 16 respectively.

The grid 13 is provided with two arms 18 which project from the casing for control of its movement. A lever 19, associated with connecting rods 20 and shafts 21 and 22, permits of imparting to the grid 13 the successive positions corresponding to each of the speeds desired.

A suitable locking device ensures the locking of the grid and therefore of the dog clutches in each of their positions. The drawings show a constructional form employing quadrants 25 notched at 24. The lateral faces of the dog clutches carry straight lateral teeth 26 (Figures 1, 5 and 6), and identical teeth are reproduced on the lateral faces of the corresponding pinions.

When the lever 19 is operated, one of the dog clutches is brought towards its pinion by the action of the corresponding grooves in the grid. Engagement of the clutch occurs at a speed which is very similar to that of the pinion, and as soon as the lateral teeth are brought opposite the spaces in the other series of teeth, they engage and the main shaft receives the whole of the power transmitted by the driving shaft. When the lever 19 is moved over still further, the dog clutch is thrown out of gear. The action is instantaneous and requires only a very slight effort owing to the flat faces of the lateral teeth and their small depth. Stops 27 fixed to the casing 3 limit the movement of the forks during movement of the grid.

The positions of the axes of the forks relatively to the grid is shown in Figure 3, and these combined positions determine the profile of the grooves which are to be cut in the flanks of the grid.

In the example selected, in fourth speed, the grid is fully inserted in the casing and the trunnions 11 of the right-hand fork are carried completely to the right of the groove. On pushing the lever into the second notch, the three pairs of trunnions will be brought into line with the axes of the grooves and none of the wheels is in engagement. The third speed is obtained by pushing the lever further, which brings the two right-hand trunnions to the left of the right-hand groove. Movement of the lever 19 to the next notch brings the whole system into the neutral position and all the trunnions are again aligned with the axes of the grooves. At the fifth notch, the gear is in second speed and the second dog clutch has been brought to the right of the axes of its grooves. At the next notch, disengagement takes place, all the trunnions being brought back into the axes of the grooves. In first speed, the central trunnions are moved towards the left. All the trunnions are brought back into line with the axes of the grooves for the last disengagement and finally, at the last notch, the mechanism is in reverse gear, the left-hand trunnions being displaced towards the right of the left-hand grooves.

The succession of speeds is obtained therefore by simple and easily performed movements of a lever in a single plane.

Figures 9 and 10 show a gearbox suitable for a bicycle, its operation being identical but the construction slightly different.

The pedals 29 of the bicycle are secured on a driving shaft 30 on which are mounted, as previously indicated, pinions 31 and dog clutches 32. Pinions 33 are keyed on a lay shaft 34 which also carries, keyed on it, pinions 35 the function of which is to transmit power through pinions 36 to a main shaft 37, on the end of which is mounted the chain wheel 38 of the bicycle over which the chain 39 passes. Forks 40 are moved by a grid 41 through the medium of shafts 42 and 43, connecting rods 44 and 45, and a rod 46. The locking mechanism (not shown) is preferably placed near the handle-bar. The gearbox takes the place of the pedal bottom bracket at the intersection of the lower tube 47, the saddle tube 48 and the tubes 49 of the bottom fork.

When the gearbox is to be used for a machine tool, two shafts are sufficient and the lay shaft is combined with the main shaft and transmits the power of the engine.

To obtain a large series of speeds which would require shafts of a length incompatible with the resistance of the metal, two or more gearboxes may be combined with each other. Two gearboxes of six speeds each will provide for example 6 × 6 = 36 speeds. If an odd number of speeds is required, it is sufficient to use only one face of a dog clutch, as shown in the gearbox for a motor car for the position of reverse gear. There is no need to adopt an increasing or decreasing order of speeds, as they may succeed each other in any order whatsoever.

Modifications in details may be made in the change-speed gearbox just described without thereby departing from the scope of the present invention.

I claim:

In a change-speed gear box of the type including a rotatable shaft, a number of gears mounted in predetermined axial relationship upon and keyed to the shaft for rotation therewith, rotatably mounted shaft means disposed parallel and adjacent to the shaft, the same number of pinions freely rotatably mounted in predetermined axial relationship upon the shaft means, and a plurality of clutches axially slidably keyed to the shaft means, the improvement comprising: said gears and pinions being axially arranged in units each consisting of a gear and pinion always in meshed relationship with each other, each pinion having one side face proximate to one side face of a clutch, said proximate side faces being provided with complementary driving means, said side faces being engageable in driving relationship upon axial displacement of the clutch toward the pinion whereby torque applied to the pinion may go through the clutch to said shaft means, a yoke for each clutch, each clutch being axially movable into or out of pinion-engagement under the force of its yoke, a pair of cam followers on each yoke disposed substantially diametrically with respect to the associated clutch, the line defined by each pair of cam followers being at all times substantially parallel to the line defined by each other pair of cam followers, a pair of substantially parallel cam plates disposed one on one side of the shaft means and the other on the other side of the shaft means and each substantially perpendicular to the lines defined by said cam followers, a plurality of pairs of cam grooves in said plates one groove of each pair being in one plate and the other groove of each pair being in the other plate, each pair of cam followers being associated with a pair of cam grooves, said cam plates being constrained to translatory movement each substantially within its own plane, and cam locking structure arranged to fix said cam plates in a selected position so as to fix said yokes and the associated clutches each in a predetermined relationship with respect to said pinions.

AUGUSTE ADELIN GUSTAVE MAGIS.

References Cited in the file of this patent

UNITED STATES PATENTS

| Number | Name | Date |
|---|---|---|
| 712,583 | Packard | Nov. 4, 1902 |
| 901,456 | Loitron | Oct. 23, 1908 |
| 972,144 | Allen | Oct. 11, 1910 |
| 1,232,608 | Ringer | July 10, 1917 |
| 1,481,687 | Carbone | Jan. 22, 1924 |
| 2,044,599 | Weinreich | June 16, 1936 |
| 2,298,527 | Chandler | Oct. 13, 1942 |
| 2,306,545 | Kummich | Dec. 29, 1942 |

FOREIGN PATENTS

| Number | Country | Date |
|---|---|---|
| 3,235 | Great Britain | June 21, 1911 |
| 204,422 | Switzerland | Apr. 1, 1939 |